JOHN SIMPSON.
Improvement in Vises.
No. 4,637. Reissued Nov. 14, 1871.
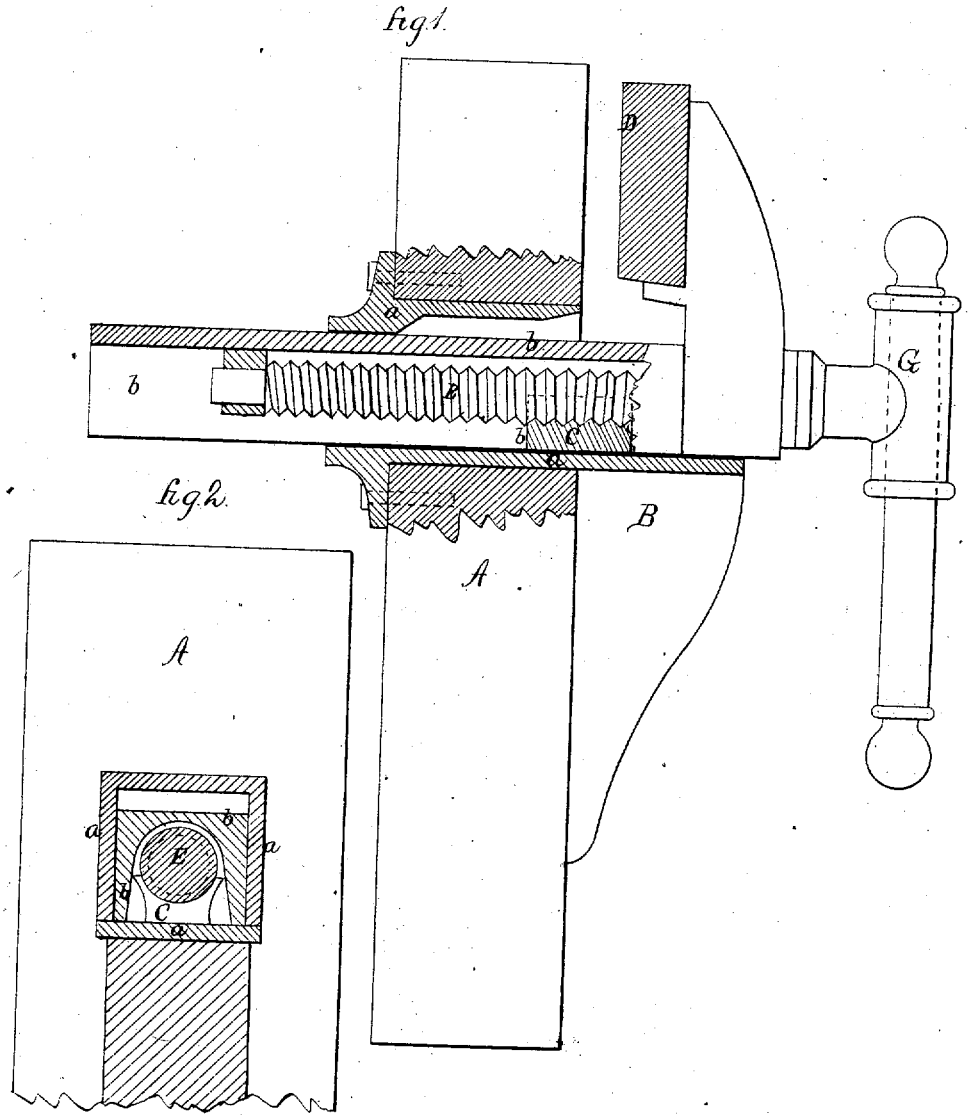
Witnesses:
Jas. E. Hutchinson
C. L. Ewert
Inventor
Jno. Simpson
per Alexander Mason
Attorneys.
AM. PHOTO-LITHOGRAPHIC CO. N.Y. (OSBORNE'S PROCESS.)

UNITED STATES PATENT OFFICE.

JOHN SIMPSON, OF CLEVELAND, OHIO.

IMPROVEMENT IN VISES.

Specification forming part of Letters Patent No. 119,658, dated October 3, 1871; reissue No. 4,637, dated November 14, 1871.

*To all whom it may concern:*

Be it known that I, JOHN SIMPSON, of Cleveland, in the county of Cuyahoga and in the State of Ohio, have invented certain new and useful Improvements in Vises; and do hereby declare that the following is a full, clear, and exact description thereof, reference being had to the accompanying drawing and to the letters of reference marked thereon.

The nature of my invention consists in the construction and arrangement of a vise, as will be hereinafter more fully set forth.

In order to enable others skilled in the art to which my invention appertains to make and use the same, I will now proceed to describe its construction and operation, referring to the annexed drawing which forms a part of this specification, and in which—

Figure 1 is a side view, part in section; and Fig. 2 is a vertical section of my vise.

A represents the bench-leg or other part of the bench through which the vise is generally passed. Through the leg A is inserted a box, *a*, the rear end of which is contracted, as shown in Fig. 1—that is, the bottom of the box is perfectly level, while the top only is inclined at the rear or inner end, making the same narrower than the main part of the box. The bottom of the box *a* extends beyond the outer side of the leg A upon a block, B, attached to the leg. On the bottom of the box *a*, at a suitable point, is placed a block, C, having part of a female screw formed in its upper side, as shown. D represents the movable jaw of the vise, provided with a rectangular box, *b*, extending at right angles with the jaw, and of such size as to fit the rear end of the box *a*. This box *b* has no bottom, and a screw, E, passes longitudinally through the same, said screw being connected with the handle or lever G for turning. The screw E gears with the screw-block or rack C, so that by turning the lever G the jaw D may be moved in and out. It will be seen that as the box *a* is higher than its rear end, the jaw D, with its box *b*, may be raised so as to lift the screw from the rack, and thus draw it out without the trouble of turning the screw. For this purpose the roof of the mouth of the box *a* is also made slightly flaring, as shown in Fig. 1.

Having thus fully described my invention, what I claim as new, and desire to secure by Letters Patent, is—

1. The box *a* provided with the rack C, and having its rear end contracted and mouth more or less flaring, substantially as and for the purposes herein set forth.

2. In combination with the box *a* having its rear end contracted, and provided with the rack C, the box *b* and screw E, constructed and arranged substantially as and for the purposes herein set forth.

In testimony that I claim the foregoing I have hereunto set my hand this 16th day of October, 1871.

JOHN SIMPSON.

Witnesses:
A. A. POPE,
OLIVER JACOBS.

(29)